2,821,821

MARKING GELATIN CAPSULES

Ernest Chu Yen, Pearl River, N. Y., assignor to American Cyanamid Company, New York, N. Y., a corporation of Maine No Drawing. Application June 16, 1955
Serial No. 516,029

1 Claim. (Cl. 53—14)

This invention relates to a marking fluid and a method for marking a soft glycerin plasticized gelatin strip preliminary to forming soft gelatin capsules therefrom.

More particularly, this invention relates to a marking fluid comprising water, a water miscible polyhydric lower aliphatic alcohol, and a water soluble dye, and in a preferred embodiment a water soluble surface active wetting agent. For edible capsules all components must be non-toxic. Details of the invention and advantages thereof will be apparent from the following description. Certain aspects of the invention are set forth and protected by the appended claims.

Machines for the manufacture of gelatin capsules and methods for their use are described in such patents as U. S. Patent 2,663,128, Stirn and Taylor, "Method and Machine for Making Capsules" and U. S. Patent 2,697,317, Stirn and Taylor, "Capsule Forming Die Roll." Certain machines for marking the gelatin strip are described in U. S. Patent 2,624,163, Stirn, "Method of Making Colored Gelatin Capsules." A machine which is useful for applying the present marking fluid is described in application Serial No. 460,108, Hansen and Glorig, "Method and Machine for Marking Capsules."

The present invention may be used with the methods and machines for the manufacture of soft gelatin capsules shown by these and other patents and methods known to the art. In manufacturing soft gelatin capsules, it is desirable to be able to mark on the surface thereof any desired design or indicia with an even color and in such a fashion that the marks are clear, without feathering or bleeding from the edges of the lines. It is desirable that the marked capsules do not offset when permitted to rest on each other immediately after formation. The marking should be economical and for many purposes the marking must be non-toxic. Soft gelatine capsules are used for some applications in which toxicity is not a problem, as for example, the encapsulation of ether to use as a starting fluid in cold weather in automobiles. The largest use of soft gelatin capsules at present is for medicinal purposes and obviously any marking fluid must be non-toxic for this purpose. It is also desirable that the marking fluid remain in a fluid state on the marking rolls so that it does not harden and gum up the machine.

The gelatin strip currently being used for the manufacture of soft gelatin capsules consists of gelatin which has been plasticized with a polyhydric alcohol to which a certain amount of water has been added. After the cutting out of the capsules from the strip, part of the water is permitted to evaporate to cause the gelatin films to harden. The polyhydric alcohol used as a plasticizer is usually at least part glycerin. The gelatin film may also have flavors, odors and dyes or pigments embedded therein.

Patent No. 2,624,163 discloses the use of alcohols as a solvent for dyes in marking fluids. This patent also discloses that polyhydric alcohols in general are not sufficiently volatile; as this patent is primarily concerned with a solvent which will evaporate to permit the dye to remain on the surface of the gelatin strip. In accordance with the present invention, it has been found, surprisingly, that by using a solvent for the marking dye which comprises a mixture of water and a water miscible polyhydric lower aliphatic alcohol which marking solvent composition is related to the plasticizer-water components used with the gelatin in the strip, the solvent rapidly and uniformly penetrates into the gelatin strip leaving the dye on the surface in such a form that mark-off, bleeding and feathering are substantially inhibited or completely controlled. The speed of penetration into the surface of the gelatin strip is markedly aided by the presence of a small amount of a water soluble surface active wetting agent. More specifically, a mixture for the solvent is preferred of from about 30 to 70 parts of water based on the amount of solvent present and from about 70 to 30 parts of a water-miscible, polyhydric lower aliphatic alcohol, including polymers thereof. Propylene glycol is particularly effective. Glycerin or polyethylene glycol are also satisfactory. Water alone or propylene glycol alone permit bleeding and propylene glycol alone is slow drying and slow penetrating so that the lines are not as uniform as with the mixture. Whereas the ratio of from 30 to 70 percent of water is very satisfactory, best results are obtained with approximately a 50–50 mixture, even though the ratio of water to glycerin in the composition from which the gelatin strip is cast may vary from this ratio.

Water soluble wetting agents such as polyoxyethylene sorbitan monooleate (Tween 80) and polyethylene stearate (Myrj) give good results in increasing the penetration of the dye into the gelatin strip. Other water soluble wetting agents which lower the surface tension of the water-polyhydric alcohol mixture are useful. Particularly effective results are obtained with bis(2-ethylhexyl) sodium sulfosuccinate (Aerosol O. T.). Good results are obtained without the use of a wetting agent but from approximately 0.05% to 1% of wetting agent increases the rate of penetration of the dye so as to permit more rapid operation and permit greater freedom from bleeding and feathering and off-set problems. 0.1% of the wetting agent is a preferred concentration. Obviously, the wetting agent must be non-toxic for capsules which are used for human consumption.

The dyes which are used in this invention must be soluble in the water-polyhydric alcohol mixture. The choice of color is, of course, within the control of the user, depending upon the color desired. A large number of water soluble dyes of various colors may be used. However, for human consumption it is more convenient to use dyes which have been approved as to toxicity. The groups of dyes known as food, drug and cosmetic dyes which have been approved by the U. S. Food and Drug Administration, are normally preferred, as with these dyes toxicity studies have already been accomplished. A group of such dyes are described in "The Application Properties of Certified 'Coal Tar' Colors," by William Peacock, Calco Division, American Cyanamid Company, Bound Brook, New Jersey (1944). Other dyes may be used after they have been proved to be non-toxic. For purposes in which the capsules are not ingested, toxic dyes may be used, or dyes may be used for which toxicity is an unknown quantity.

The concentration of the dye may vary over a rather wide range depending upon the degree of solubility in the mixture of water and the polyhydric alcohol, the natural intensity of the dye, and the depth of color desired on the capsule. A concentration of from about 1% to about 12% forms a preferred range. The preferred concentration within this range varies with the dye and the depth of color desired.

Whereas it will be obvious that numerous other compositions can be made following the teachings here, the following examples are given as illustrative of certain modifications of proportions and ingredients which give a good mark on the capsules. In accordance with standard pharmaceutical practice, the parts and percentages of liquids are given by volume (for instance, milliliters) and the parts and percentages of solids are given by weight (for instance, grams).

*Example 1*

500 milliliters of commercial propylene glycol and 500 milliliters of water were mixed together. To this mixture was added 70 grams of blue dye known as FD&C Blue #1. The mixture was stirred and to the mixture was added 1 milliliter of a liquid concentrate of bis(2-ethylhexyl) sodium sulfosuccinate (Aerosol O. T. clear 70%). The mixture was shaken and permitted to stand overnight. When ready for use the thus prepared marking fluid was found to print satisfactorily by a continuous rotary method from either rubber or metal dies onto a soft gelatin strip comprising a glycerin plasticized gelatin. Whereas the marking fluid will work on a wide variety of gelatin strip, the particular one used for the test contained 48% gelatin, 18% glycerin and 34% water at the time it was cast on a die roll. Capsules were formed therefrom on a machine similar to that described in U. S. Patent 2,697,317 and satisfactory capsules were obtained. The capsules so marked could be dropped into a container as soon as they came from the capsuling machine and were found not to offset and not to bleed, but give a perfectly satisfactory marking on the film. After the capsules were dried, the printing was found to be resistant to removal by water, alcohol, esters and oils.

*Example 2*

A solution was prepared of 500 parts propylene glycol and 500 parts of water. To this was added with stirring FD&C Blue #1 dye. Also thereto was added 1 gram of bis(2-ethylhexyl) sodium sulfosuccinate as a waxy solid. The mixture was heated and stirred until the bis(2-ethylhexyl) sodium sulfosuccinate had dissolved. When used with rubber type on a rotary marker it was found that the impressions obtained with this solution containing the dye varied in their intensity with a quantity of dye which had been dissolved. With 1% by weight of dye in the solution, the marking was very light. With 3% of dye, the marking was light. With 9% of dye, the marking was good but very heavy. With 12% by weight of dye the marking was also good but also extremely heavy. With over 7% by weight of dye the tendency toward mark-off increases and the use of extra dye does not give advantages commensurate with the extra cost.

*Example 3*

The procedure of Example 2 was followed using 7% by weight of dye and 0.1% of bis(2-ethylhexyl) sodium sulfosuccinate as a wetting agent with a plurality of proportions of propylene glycol and water (by volume) as the solvent. On using 80% of propylene glycol and 20% water as solvent the lines were not uniform, were slow drying, and slow penetration of the ink was observed. With 60% propylene glycol and 40% water, good results were obtained. With 50% of each, excellent results were obtained. With 40% propylene glycol and 60% water, the results were good. However, with 20% propylene glycol and 80% of water, there is a tendency toward bleeding where the color would bleed from one capsule to another on standing. This experiment shows that the ratio of the polyhydric alcohol to water should be not too different from the ratio of polyhydric alcohol to water in the gelatin formulation to be printed, and about 30% to 70% is an effective range.

*Example 4*

A series of tests were run using a 50% propylene glycol, 50% water solution containing 7% by weight of FD&C Red #2 dye. The quantity of bis(2-ethylhexyl) sodium sulfosuccinate was varied. Using rubber type and marking on a freshly cast soft glycerin plasticized gelatin strip from which capsules were to be formed, it was found that without the wetting agent, a good mark was obtained. With 0.05% of the wetting agent, a better mark was obtained and with a 0.1% concentration the best results were obtained. The marking became slightly less desirable as the concentration increased and over 1% tended to give a poor mark with a light print. The use of the wetting agent increases the efficacy of marking, renders it easier to control and decreases the bleeding or the time required for the dye to go into the gelatin film and after which the bleeding or feathering will not occur.

*Example 5*

Using the procedure of Example 2, with a 50% propylene glycol 50% water solution and a 5% FD&C Violet #1 dye, at a wetting agent concentration of 0.1%, various wetting agents were tried to determine their efficacy. Polyoxyethylene sorbitan monooleate (Tween 80) gave good results. Polyethylene stearate (Myrj) gave good results.

Using the procedure set forth in Example 2, marking of the soft glycerin plasticized gelatin strip was accomplished using a 50% polyhydric alcohol, 50% water solution and 0.1% of bis(2-ethylhexyl) sodium sulfosuccinate and 7% of FD&C Orange #1.

Using glycerin as the polyhydric alcohol, a good marking was obtained. Using polyethylene glycol as the polyhydric alcohol, good marking was obtained.

A monohydric alcohol such as ethyl alcohol in 50% aqueous solution dried too rapidly so that the lines were not as uniform and gave some trouble with clogging of the type.

As will be obvious various dyes and various concentrations may be used to accomplish the pattern of marking which is desired. Any dye which is acceptable from the standpoint of toxicity and which is soluble in the water miscible polyhydric lower aliphatic alcohol-water solution is satisfactory for the marking. It is preferred to use the FD&C approved dyes to insure that dyes of known non-toxicity are embodied. Obviously, the gelatin strip itself may be cast from a colored composition and used with a different color dye so as to give a patterned capsule, or a plurality of dyes may be used with a multiplicity of marking rolls so that only the surface of the gelatin film is colored over any desired area or even completely, and then over the partly dyed material is printed one or more other dye colors so as to give contrasting patterns which may be desired for trademark or esthetic reasons.

These variations in choices of color are obvious to those skilled in the art in view of the foregoing disclosure.

I claim:

A method of forming an edible soft gelatin capsule with vsible indicia which includes the steps of dissolving a water soluble dye in a mixture of from 30 to 70 parts of water and 70 to 30 parts of a water-soluble polyhydric alcohol selected from the group consisting of glycerine, polyethylene glycol, and propylene glycol and in which solution is incorporated from 0.05 to 1 part of a water-soluble surface-active wetting agent, and applying the thus formed solution to selected portions of a wet, freshly cast, edible, glycerin-plasticized soft gelatin strip, causing said solution to rapidly penetrate into said strip, and forming soft gelatin capsules from portions of the thus marked strip.

References Cited in the file of this patent

UNITED STATES PATENTS

| | | |
|---|---|---|
| 1,678,648 | Replogle | July 21, 1928 |
| 2,306,863 | Bour | Dec. 5, 1942 |
| 2,624,163 | Stirn | Jan. 6, 1953 |
| 2,652,343 | Payne | Sept. 15, 1953 |

U. S. DEPARTMENT OF COMMERCE
PATENT OFFICE

CERTIFICATE OF CORRECTION

Patent No. 2,821,821     Ernest Chu Yen     February 4, 1958

It is hereby certified that error appears in the printed specification of the above numbered patent requiring correction and that the said Letters Patent should read as corrected below.

Column 1, line 47, for "gelatine" read -- gelatin --; column 4, following "results." in line 22, insert -- Example 6 --, italized and in centered position; line 57, for "vsible" read -- visible --.

Signed and sealed this 10th day of June 1958.

(SEAL)
Attest:
KARL H. AXLINE

Attesting Officer

ROBERT C. WATSON
Commissioner of Patents